(12) United States Patent
Palmisano

(10) Patent No.: US 11,932,084 B2
(45) Date of Patent: Mar. 19, 2024

(54) METHOD FOR DETERMINING A LEVEL OF REFRIGERANT CHARGE IN A COOLING CIRCUIT OF AN AIR-CONDITIONING SYSTEM AND MODULE FOR DETECTING LEAKS

(71) Applicant: Faiveley Transport NSF, Neuville-en-Ferrain (FR)

(72) Inventor: Domenico Palmisano, Marcq en Baroeul (FR)

(73) Assignee: FAIVELEY TRANSPORTATION NSF, Neuville-en-Ferrain (FR)

( * ) Notice: Subject to any disclaimer, the term of this patent is extended or adjusted under 35 U.S.C. 154(b) by 328 days.

(21) Appl. No.: 17/419,615

(22) PCT Filed: Dec. 27, 2019

(86) PCT No.: PCT/FR2019/053304
§ 371 (c)(1),
(2) Date: Dec. 24, 2021

(87) PCT Pub. No.: WO2020/141279
PCT Pub. Date: Jul. 9, 2020

(65) Prior Publication Data
US 2022/0134844 A1    May 5, 2022

(30) Foreign Application Priority Data
Dec. 31, 2018    (FR) ........................................ 1874408

(51) Int. Cl.
*B60H 1/32*    (2006.01)

(52) U.S. Cl.
CPC ......... *B60H 1/3225* (2013.01); *B60H 1/3222* (2013.01); *B60H 1/3227* (2013.01);
(Continued)

(58) Field of Classification Search
CPC .............. B60H 1/00978; B60H 1/3225; B60H 1/3222; B60H 1/3227; B60H 2001/3238;
(Continued)

(56) References Cited

U.S. PATENT DOCUMENTS

| 6,591,631 B1* | 7/2003 | Taira ..................... C09K 5/045 |
| | | 62/114 |
| 2002/0170307 A1* | 11/2002 | Nishizuka ................. F24F 1/06 |
| | | 62/229 |

(Continued)

FOREIGN PATENT DOCUMENTS

| EP | 2546588 A1 | 1/2013 |
| GB | 2258047 A | 1/1993 |

OTHER PUBLICATIONS

International Search Report for related PCT Application No. PCT/FR2019/053304 dated May 15, 2020 (2 pages).

*Primary Examiner* — Marc E Norman
(74) *Attorney, Agent, or Firm* — The Small Patent Law Group LLC; Philip S. Hof

(57) ABSTRACT

A method for determining a level of refrigerant charge in a cooling circuit of an air-conditioning system and a module for leak detection are provided. The method includes determining a total quantity of refrigerant contained in the cooling circuit of the air-conditioning system solely based on data internal to the air-conditioning system.

20 Claims, 5 Drawing Sheets

(52) U.S. Cl.
CPC .............. *B60H 2001/3238* (2013.01); *B60H 2001/3248* (2013.01); *B60H 2001/3255* (2013.01)

(58) Field of Classification Search
CPC .... B60H 2001/3248; B60H 2001/3255; F25B 2500/222; F25B 2500/21; F25B 2500/23; F25B 2700/19; F25B 2700/21
See application file for complete search history.

(56) References Cited

U.S. PATENT DOCUMENTS

| | | | |
|---|---|---|---|
| 2003/0182950 A1* | 10/2003 | Mei ..................... | F25B 49/005 62/129 |
| 2004/0118135 A1* | 6/2004 | Lee ..................... | F25B 49/022 62/175 |
| 2005/0172652 A1* | 8/2005 | Ben Yahia ........... | B60H 1/3216 62/239 |
| 2007/0163276 A1* | 7/2007 | Braun .................. | F25B 49/005 62/149 |
| 2009/0126379 A1* | 5/2009 | Yamaguchi ............. | F25B 13/00 62/149 |
| 2011/0308267 A1 | 12/2011 | Tamaki et al. | |
| 2021/0140661 A1* | 5/2021 | McCune ................. | F24F 11/63 |

* cited by examiner

METHOD FOR DETERMINING A LEVEL OF REFRIGERANT CHARGE IN A COOLING CIRCUIT OF AN AIR-CONDITIONING SYSTEM AND MODULE FOR DETECTING LEAKS

CROSS-REFERENCE TO RELATED APPLICATIONS

This application is a national stage entry of PCT Application No. PCT/FR2019/053304, which was filed 27 Dec. 2019 and claims priority to French Patent Application No. FR 1874408, which was filed 31 Dec. 2018. The entire disclosures of both applications are incorporated herein by reference.

BACKGROUND

Technical Field

The present invention relates to a method for determining a level of refrigerant charge in a cooling circuit of an air-conditioning system. It also relates to a method and a device for detecting leaks in the cooling circuit of the air-conditioning system.The invention also applies in particular to vehicles equipped with air-conditioning systems, for example, such as railway vehicles or other means of passenger transport, such as in an urban environment.

State of the Art

Today, the temperature conditions in which passengers are carried have become an important aspect of the comfort provided by a vehicle consisting for example of a trainset on an overground, tramway or metro line. As a result, in addition to the discomfort caused, failures of the heating, ventilation and air-conditioning system (generally referred to by the acronym HVAC) can lead to the immobilisation of a trainset, causing loss of income for the operator and delays for the passengers. One of the main causes of HVAC system breakdown is associated with leaks of refrigerant from the cooling circuit. These leak problems are particularly insidious as they are not preceded by advance warning signs until the summer period when temperatures rise. The impact of these leaks in terms of environmental cost and cost of refrigerant can be very high.

In the field of railway rolling stock, there are different solutions associated with detecting leaks of refrigerant. These known solutions are all empirical and are for example based on correlation of the time necessary to reach a certain pressure during pumping at the outlet of the evaporator or using the exterior temperature to measure overheating. However, the result of these solutions is poor in terms of accuracy, owing to the need to compensate for a multitude of parameters, such as for example compensating for the expansion devices, the speeds of the different fans, the clogging of the filters and heat exchangers, or for the internal and external temperature and hydrometry level.

BRIEF SUMMARY

An object of the invention is to solve these problems and to avert failures of HVAC systems owing to leaks of refrigerant, by proposing a method for determining the level of refrigerant charge in a cooling circuit for an on-board air-conditioning system in which the total quantity of refrigerant in gaseous and liquid form contained in the different components of the air-conditioning system is determined solely on the basis of data internal to the cooling circuit.

Determining the total quantity of refrigerant in gaseous and liquid form solely using data internal to the cooling circuit and dispensing with data external to the circuit makes it possible to obtain more accurate results. As a consequence, the detection of leaks of refrigerant is improved.

Advantageously, in the method for determining the level of refrigerant charge according to the invention, the data internal to the circuit used are data corresponding to the geometric and technical parameters of the different components of the cooling circuit, as well as items of information on the type of refrigerant used, and physical data of the refrigerant, measured in different parts of the circuit corresponding to different enthalpy levels.

Preferably, in the method for determining the level of refrigerant charge, the data corresponding to the geometric and technical parameters of the different components of the air-conditioning system comprise at least the thermodynamic characteristics of a compressor of the air-conditioning system, the geometric characteristics of said compressor, the internal geometric characteristics of an evaporator of the air-conditioning system, the internal geometric characteristics of a condenser of the air-conditioning system, and/or the internal geometric characteristics of a liquid line of said air-conditioning system.

Advantageously, in the method for determining the level of refrigerant charge according to the invention, the measured physical data of the refrigerant comprise at least pressure measurements and temperature measurements.

Preferably, in the method for determining the level of charge of a cooling circuit according to the invention, the refrigerant pressure measurements correspond to a high pressure and a low pressure of an enthalpy cycle of said air-conditioning system, and/or the refrigerant temperature measurements correspond to a superheating temperature and a subcooling temperature of said enthalpy cycle.

Additionally, in the method for determining the level of charge of a cooling circuit according to the invention, a measurement of the power supply voltage of the compressor is taken into account for calculating the total level of refrigerant charge.

Preferably, in the method for determining the level of charge of a cooling circuit according to the invention, the pressure/temperature enthalpy cycle is defined taking into account the measured superheating and subcooling temperatures, and the measured high and low pressures.

Additionally, in the method for determining the level of charge of a cooling circuit according to the invention, a mass flow of refrigerant is calculated on the basis of the measured superheating and subcooling temperatures, the measured high and low pressures, and the power supply voltage and the thermodynamic characteristics of the compressor.

Advantageously, in the method for determining the level of charge of a cooling circuit according to the invention, a quantity of refrigerant in gas phase is calculated on the basis of the geometric characteristics of said compressor, the mass flow of the refrigerant, and the pressure/temperature enthalpy cycle.

Preferably, in the method for determining the level of charge of a cooling circuit according to the invention, a quantity of refrigerant in liquid phase is calculated on the basis of the internal geometric characteristics of a liquid line of said air-conditioning system, the mass flow of the refrigerant, and the pressure/temperature enthalpy cycle.

Advantageously, in the method for determining the total level of charge of a cooling circuit according to the invention, a quantity of refrigerant in liquid/gas phase in the evaporator is calculated on the basis of the internal geometric characteristics of the evaporator of said air-conditioning system, the mass flow of the refrigerant, and the pressure/temperature enthalpy cycle.

Moreover, in the method for determining the total level of charge of a cooling circuit according to the invention, a quantity of refrigerant in liquid/gas phase in the condenser can be calculated on the basis of the internal geometric characteristics of the condenser of said air-conditioning system, the mass flow of the refrigerant, and the pressure/temperature enthalpy cycle.

Advantageously, in the method for determining the total level of charge of a cooling circuit, the total quantity of refrigerant contained in the cooling circuit is obtained by the sum of the quantity of refrigerant in liquid phase, in gas phase and in liquid/gas phase in the condenser and in the evaporator.

In a second aspect of the invention, a method is proposed for detecting leaks in a cooling circuit for an on-board air-conditioning system comprising the steps of determining a total level of refrigerant charge in the circuit according to the method defined above, defining a nominal level of refrigerant charge, analysing the total level of charge calculated with respect to the nominal level of charge, and deducing a prediction of loss of functionality of the air-conditioning system.

Advantageously, the method for detecting leaks in a cooling circuit according to the invention also comprises a step of transmitting the calculated total level of charge to an analysis device on the ground by a communication device via radio or data transfer bus. According to this method, the analysis device on the ground performs the steps of analysing the total level of charge calculated with respect to the total nominal level of charge and deducing the prediction of loss of functionality of the air-conditioning system.

According to a third aspect of the invention, a module for detecting leaks in a cooling circuit for an on-board air-conditioning system is proposed, comprising sensors capable of measuring physical characteristics of the refrigerant in different parts of the circuit corresponding to different enthalpy levels, and a controller capable of determining, according to the determination method defined above, the level of refrigerant charge contained in the different components of the air-conditioning system on the basis of data corresponding to the geometric and technical parameters of the different components of the air-conditioning system, the type of refrigerant used, and the signals generated by said sensors, which are representative of the physical characteristics of the refrigerant measured in different parts of the circuit.

Preferably, the module for detecting leaks in a cooling circuit for an on-board air-conditioning system according to the invention also comprises a communication device via radio or data transfer bus. The communication device transmits the level of refrigerant charge calculated by said module to an analysis device on the ground.

Additionally, the module for detecting leaks in a cooling circuit for an on-board air-conditioning system according to the invention can also comprise a voltage sensor capable of measuring the power supply voltage of a compressor of the air-conditioning system.

Advantageously, in the module for detecting leaks in a cooling circuit for an on-board air-conditioning system according to the invention, the sensors comprise at least two temperature sensors and/or at least two pressure sensors.

Preferably, in the module for detecting leaks in a cooling circuit for an on-board air-conditioning system according to the invention, a first temperature sensor is situated on the cooling circuit between an expansion valve and a condenser of the on-board air-conditioning system, and is capable of measuring a subcooling temperature of the circuit, and a second temperature sensor is situated on the circuit between the compressor and an evaporator of the on-board air-conditioning system, and is capable of measuring a superheating temperature of the circuit.

Moreover, in the module for detecting leaks in a cooling circuit for an on-board air-conditioning system according to the invention, the sensors can also comprise at least one first pressure sensor situated on the cooling circuit between the compressor and a condenser of the on-board air-conditioning system, capable of sending a signal representative of the high pressure of the circuit, and a second pressure sensor situated on the cooling circuit between the compressor and an evaporator of the on-board air-conditioning system, capable of sending a signal representative of the low pressure of the circuit.

Preferably, in the module for detecting leaks in a cooling circuit for an on-board air-conditioning system according to the invention, the sensors for measuring physical characteristics of the refrigerant in different parts of the circuit are those of the air-conditioning system, and a main controller of the air-conditioning system carries out the functions of determining the total level of refrigerant charge.

According to a fourth aspect of the invention, a passenger transport vehicle is proposed equipped with an air-conditioning system and comprising a module for detecting leaks on a cooling circuit of said on-board air-conditioning system as defined above.

According to a fifth aspect of the invention, a program is proposed comprising instructions which, when the program is executed by a main controller of an on-board air-conditioning system or by a specific controller, causes said controller to execute the steps of the method defined above.

Other features and advantages of the invention are disclosed by the following description of non-limitative exemplary embodiments of the different aspects of the invention. The description refers to the attached figures, which are also given by way of non-limitative exemplary embodiments of the invention.

DETAILED DESCRIPTION

The invention is described hereinafter in the context of a railway passenger carriage equipped with an on-board HVAC system. This configuration implementing the invention is described merely for better understanding of the invention, but cannot be regarded as limiting it. The same applies for all the other examples of implementation of the different features constituting the invention described hereinafter.

Figure 1:
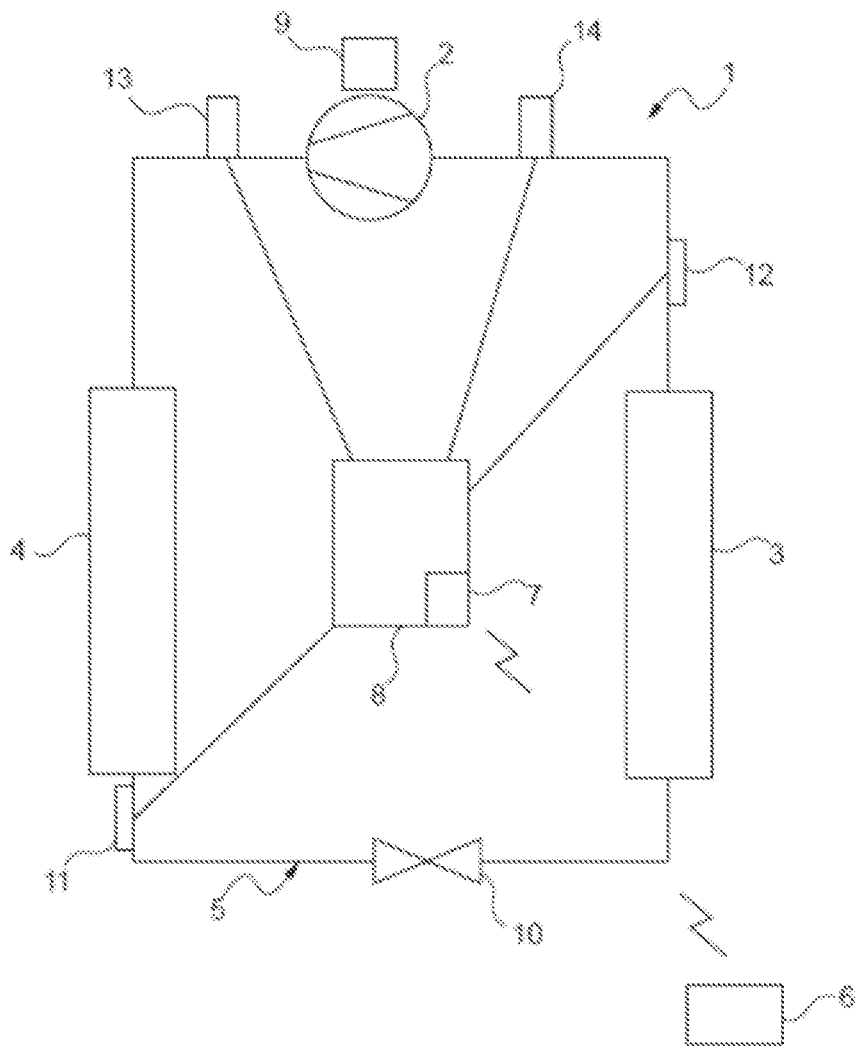
FIG. 1 shows a diagram of the cooling circuit of the on-board air-conditioning system according to the invention.

As shown in FIG. 1, a cooling circuit of an HVAC system 1 typically comprises a compressor 2, a condenser 4, a liquid line 5 comprising an expansion valve 10, and an evaporator 3. A refrigerant, for example R134a, flows in this circuit. This refrigerant in the circuit can sometimes be in liquid phase as in the liquid line 5, and sometimes in gas phase as in the compressor 2. In the condenser 4 and the evaporator 3, the refrigerant is in both gas phase and liquid phase. In order to detect a leak of refrigerant, the circuit of the HVAC system is equipped with a module for detecting leaks according to the invention. In one exemplary embodiment of the invention, the module for detecting leaks comprises a controller 8 and different sensors that transmit signals to the controller, exclusively representing internal parameters of the circuit 1 of the HVAC system. On the basis of these items of information supplied by the sensors, items of information relating to the thermodynamic and geometric characteristics of the components of the circuit, and the characteristics of the refrigerant used, for example R134a, the controller determines the quantity of refrigerant in the different components of the circuit and then deduces therefrom the total quantity of refrigerant contained in the circuit 1.

The module for detecting leaks also comprises a communication device 7 which transmits the total quantity of fluid determined by the controller 8 to an analysis station on the ground 6 that determines the fluid losses and the potential losses of functionality that arise therefrom. Data transmission between the communication device 7 of the module for detecting leaks and the analysis station on the ground can take place, for example, by radio transmission or via data transfer bus. The main controller of the carriage or of the HVAC system can be used in the module for detecting leaks to determine the quantity of refrigerant contained in the circuit. The same applies for all or some of the sensors transmitting the items of information that is required to the controller 8. Most of the sensors are already present in the HVAC systems of existing vehicles and can thus be re-used for the module for detecting leaks of refrigerant. For older vehicles, these sensors and the controller 8 can in most cases be installed, for example on the occasion of a maintenance operation.

In addition to the controller 8 and the communication device 7, the module for detecting leaks of refrigerant comprises two pressure sensors mounted on the cooling circuit 1. A high pressure sensor 13 is situated between the compressor 2 and the condenser 4 of the on-board air-conditioning system, and a low pressure sensor 14 is situated between the compressor 2 and an evaporator 3 of the on-board air-conditioning system. These pressure sensors 13 and 14 transmit signals to the controller 8 that are representative of the pressure of the refrigerant downstream and upstream of the compressor 2. The module for detecting leaks also comprises two temperature sensors also installed on the cooling circuit 1. A first temperature sensor 11 is situated between the expansion valve 10 and the condenser 4 of the on-board air-conditioning system. This temperature sensor 11 measures the subcooling temperature of the refrigerant in the circuit. A second temperature sensor 12 is situated between the compressor 2 and the evaporator 3 of the on-board air-conditioning system. This temperature sensor 12 measures the superheating temperature of the refrigerant in the circuit. Optionally, a voltage sensor 9 can be mounted on the power supply to the compressor 2 so that the signal representative of the power supply voltage of the compressor is transmitted to the controller 8.

Figure 2:
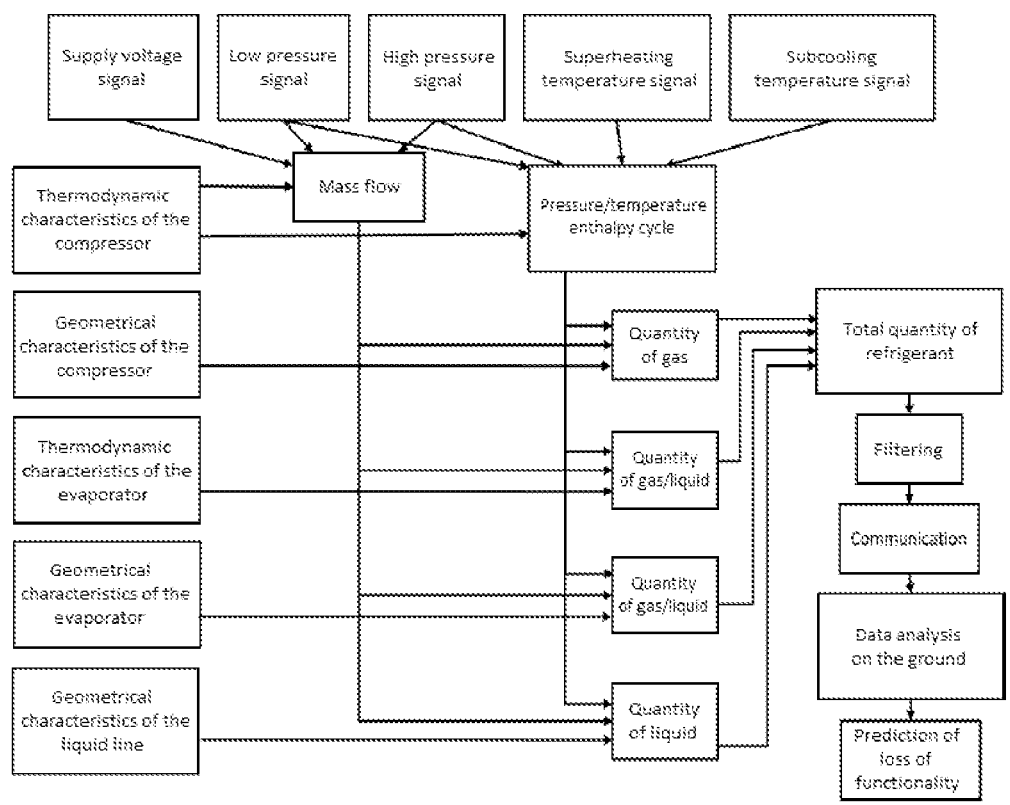
FIG. 2 shows a diagram representing the method for detecting leaks according to the invention.

FIG. 2 shows the logic on which the method for detecting leaks of refrigerant is based, implemented by the controller 8 for determining the total quantity of refrigerant contained in the cooling circuit. Transmitting the total quantity of fluid contained in the circuit makes it possible to monitor fluid quantity change as a function of time. Before being transmitted by the communication device 7 to the analysis device on the ground 6, the signal is filtered in order to identify and eliminate unwanted effects resulting from any surcharges of refrigerant with respect to the critical charge. The method for determining the level of refrigerant charge in the circuit of an HVAC system solely uses data internal to the cooling circuit as described below. This data corresponds to the geometric and technical parameters of the different components of the cooling circuit, information about the type of refrigerant used, and the high and low pressures as well as the superheating and subcooling temperatures of the refrigerant measured in different parts of the circuit by sensors positioned as described above and corresponding to different enthalpy levels.

The data corresponding to the geometric and technical parameters of the different components of the air-conditioning system are the thermodynamic and geometric characteristics of the compressor 2, the internal geometric characteristics of the evaporator 3 and of the condenser 4, and the internal geometric characteristics of the liquid line 5.

Thus, as shown in FIG. 2, the mass flow of the refrigerant in the cooling circuit is determined on the basis of the measured high and low pressures as well as the superheating temperature, the power supply voltage of the compressor, and the thermodynamic characteristics of the compressor. The pressure/temperature enthalpy cycle of the refrigerant is obtained on the basis of the measured high and low pressures, of the superheating and subcooling temperature, and of the thermodynamic characteristics of the compressor.

In turn, the pressure/temperature enthalpy cycle and the mass flow make it possible to determine the quantity of gas in the gas line and the compressor with the geometric characteristics of the compressor, the quantity of gas and liquid in the evaporator with the geometric characteristics of the evaporator, the quantity of gas and liquid in the condenser with the geometric characteristics of the condenser, and the quantity of liquid in the liquid line with the geometric characteristics of the liquid line. Once determined, these four quantities of refrigerant make it possible to obtain the total quantity of refrigerant contained in the circuit as a whole.

The mass flow of refrigerant drawn in and discharged by the compressor is calculated by using the polynomial formulas given by the manufacturer. Such as for example: $M=C0+C1*S+C2*D+C3*S^2+C4*S*D+C5*D^2+C6*S^3+C7*D*S^2+C8*S*D^2+C9*D^3$. In this formula, C1 to C9 are coefficients, S is the evaporation temperature in ° C., D is the condensation temperature in ° C., and the resultant M is the sought mass flow in kg/s. The mass flow is calculated for a nominal superheating value. It must therefore be recalculated for the actual superheating value on the cooling circuit in view of the impact of temperature on the density of the gas that is drawn in by the compressor 2. The coefficients, for their part, are calculated for a certain frequency. It is therefore necessary to recalculate the mass flow for the actual frequency by multiplying the result by the ratio: actual frequency/nominal frequency.

Figure 3:
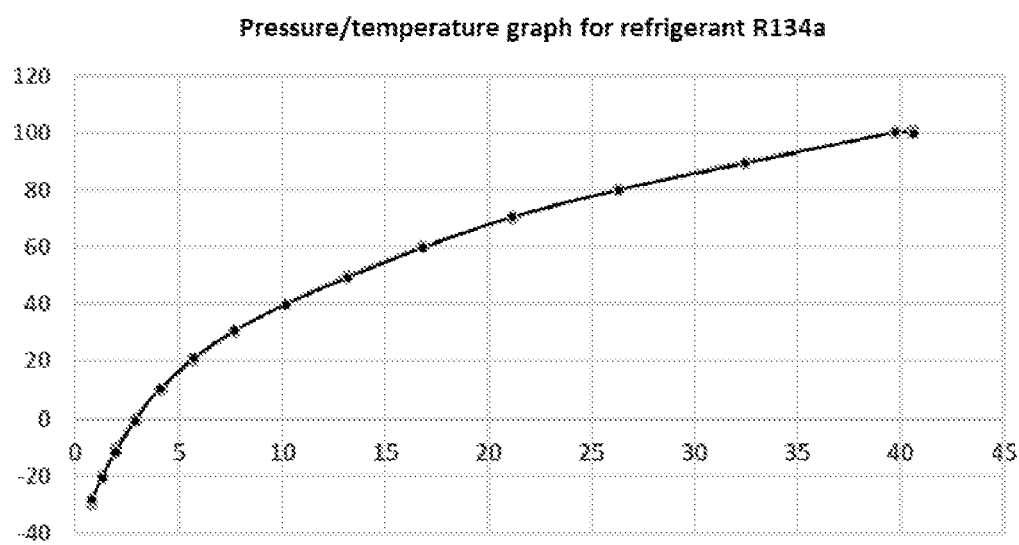
FIG. 3 shows a graph of changing pressure as a function of temperature for a typical refrigerant.
Figure 4:
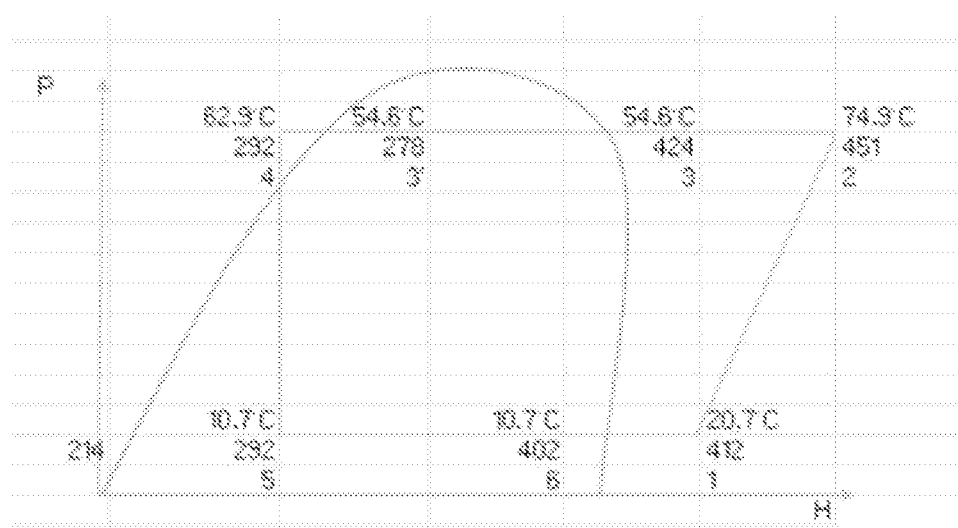
FIG. 4 shows an enthalpy diagram for a typical refrigerant.

In the modelling of the enthalpy cycle of the refrigerant, the polynomials of the fluid used are: the pressure with respect to the temperature, the density of the liquid with respect to the pressure, the density of the gas with respect to the density, the molar specific heat of the liquid with respect to the pressure, the molar specific heat of the gas with respect to the pressure, the enthalpy of the liquid with respect to the pressure and the enthalpy of the gas with respect to the pressure. The graph of pressure against temperature, shown in FIG. 3, is obtained. With this data it is possible to draw the pressure/temperature enthalpy graph shown in FIG. 4.

The dimensions of the tubes constituting the condenser, the evaporator and the liquid line are used to estimate the volume, the velocity and the density of the fluid in the tubes. For example:

|  | Number of tubes | Length | Rows | Diameter | Thickness | Volume |
| --- | --- | --- | --- | --- | --- | --- |
| Condenser | 19 | 1.10 mm | 8 | 9.52 mm | 0.28 mm | 10.5 l |
| Evaporator | 10 | 1.05 mm | 6 | 9.52 mm | 0.28 mm | 4.0 l |
| Liquid line |  | 4.13 mm |  | 16.0 mm | 1.0 mm | 0.6 l |

As the liquid line 5 is full of liquid, it is possible to determine the volume of fluid therein by considering the density of the fluid at the pressure of the condenser (given by the high pressure sensor 13) and the subcooling temperature (given by the subcooling temperature sensor 11).

It is also possible to determine the density in the evaporator 3 and the condenser 4, knowing the number of circuits in the heat exchanger and the mass flow, which is fixed throughout the whole length of the circuit. The equivalent density is calculated by integrating superheating/desuperheating in the percentage of liquid according to the enthalpy diagram.

Because the density of the gas is 1000 times lower than that of the liquid, it is possible to disregard the volume contribution of the gas line and of the compressor 2.

Figure 5:
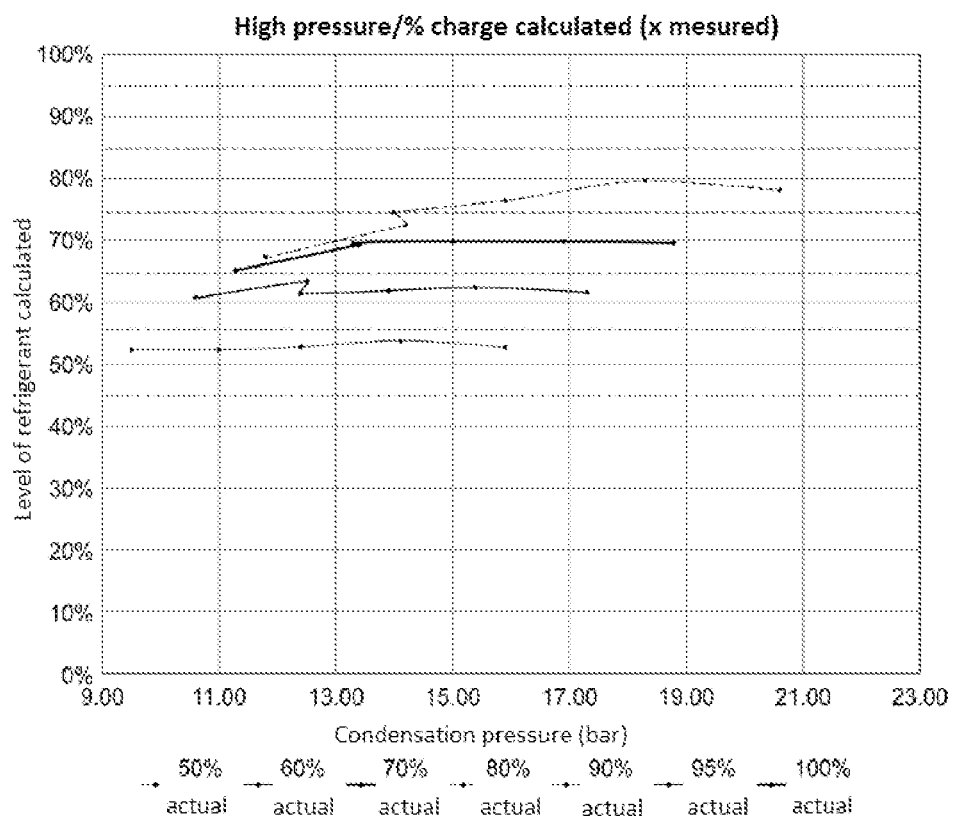
FIG. 5 shows the results of tests conducted with different levels of refrigerant charge.

FIG. 5 shows the results of tests conducted in the laboratory with a cooling circuit in a climate chamber at different exterior and interior conditions. The x-axis shows the condensation pressures. The y-axis shows the calculated refrigerant level. The curves in different colours show the results of the calculation for the different tested levels of charge of fluid. The deformation of the curves for the low condensation pressures is due to the effect of the excess of liquid in the condenser.

The method described above is transcribed into a computer program the instructions of which, when they are executed by a controller, make it possible to determine the quantity of refrigerant contained in a cooling circuit for an HVAC system. The program can equally well be installed in a specific controller of the module for detecting leaks of refrigerant as in a main controller, such as the one that manages the operation of the HVAC system.

The combination of the advantages obtained by the different aspects of the method and the module described above make it possible to determine the total quantity of fluid in a cooling circuit for an HVAC system solely on the basis of parameters internal to the circuit. It is thus possible to eliminate the impact of clogging of the heat exchangers and of the volume of air surrounding them on all the other variables affecting the heat transfer coefficient. The theoretical approach described above thus makes it possible to apply the solution of the invention to all the vehicles of a fleet without a costly programme of tests, since only one adjustment test is necessary.

As the module for detecting leaks of refrigerant is a stand-alone product, it can be installed in all the vehicles equipped with on-board HVAC systems, whether they are new or due to be updated.

Communication by data transfer bus or by radio between the controller 2 of the module for detecting leaks and the analysis station on the ground 6 makes it possible to monitor the state of the HVAC systems of a fleet of passenger transport vehicles and to assess the interval for an operation to repair and/or refill the circuit as a function of monthly temperature forecasts. In terms of ecological impact, the ability to intervene on the HVAC system before the cooling circuit is completely discharged significantly reduces emission into the atmosphere of refrigerant responsible for global warming.

Although in the above description the specific aspects of the invention, in particular the implementation of the method for determining the quantity of refrigerant in a cooling circuit, and the method for detecting leaks for on-board HVAC systems, have been described in the context of a passenger carriage, they could be implemented in other configurations, in particular with other types of passenger transport vehicle.

The invention claimed is:

1. A method comprising:
   determining a mass flow rate of a refrigerant contained in a cooling circuit of an air-conditioning system, the mass flow rate determined based in part on a measurement of a power supply voltage of a compressor of the air-conditioning system; and
   determining a total quantity of the refrigerant contained in the cooling circuit solely based on data internal to the air-conditioning system including the mass flow rate of the refrigerant.

2. The method of claim 1, wherein the data internal to the air-conditioning system used to determine the total quantity of the refrigerant comprises:
   the mass flow rate of the refrigerant;
   data corresponding to geometric and technical parameters of different components of the air-conditioning system;
   information on a type of the refrigerant; and
   physical data of the refrigerant measured in different parts of the cooling circuit corresponding to different enthalpy levels.

3. The method of claim 2, wherein the data corresponding to the geometric and technical parameters of the different components of the air-conditioning system includes one or more of:
   thermodynamic characteristics of the compressor;
   geometric characteristics of the compressor;
   internal geometric characteristics of an evaporator of the air-conditioning system;
   internal geometric characteristics of a condenser of the air-conditioning system; or
   internal geometric characteristics of a liquid line of the air-conditioning system.

4. The method of claim 2, wherein the physical data of the refrigerant measured in different parts of the cooling circuit corresponding to different enthalpy levels includes pressure measurements of the refrigerant and temperature measurements of the refrigerant.

5. The method of claim 4, wherein the pressure measurements of the refrigerant include a high pressure measurement of an enthalpy cycle downstream of the compressor and a low pressure measurement of the enthalpy cycle upstream of the compressor, and the temperature measurements of the refrigerant include a superheating temperature measurement of the enthalpy cycle and a subcooling temperature measurement of the enthalpy cycle.

6. The method of claim 1, wherein the mass flow rate of the refrigerant is determined based on: (i) the power supply voltage; (ii) a superheating temperature of an enthalpy cycle of the air-conditioning system, (iii) a subcooling temperature of the enthalpy cycle, (iv) a high pressure of the enthalpy cycle, (v) a low pressure of the enthalpy cycle, and (vi) thermodynamic characteristics of the compressor.

7. The method of claim 1, further comprising calculating a first quantity of the refrigerant in gas phase based on geometric characteristics of the compressor, the mass flow rate of the refrigerant, and an enthalpy cycle of the air-conditioning system.

8. The method of claim 7, further comprising calculating a second quantity of the refrigerant in liquid phase based on internal geometric characteristics of a liquid line of the air-conditioning system, the mass flow rate of the refrigerant, and the enthalpy cycle.

9. The method of claim 8, further comprising calculating a third quantity of the refrigerant in an evaporator of the air-conditioning system based on internal geometric characteristics of the evaporator, the mass flow rate of the refrigerant, and the enthalpy cycle.

10. The method of claim 9, further comprising calculating a fourth quantity of the refrigerant in a condenser of the air-conditioning system based on internal geometric characteristics of the condenser, the mass flow rate of the refrigerant, and the enthalpy cycle.

11. The method of claim 10, wherein determining the total quantity of the refrigerant contained in the cooling circuit comprises determining a sum of the first, second, third, and fourth quantities of the refrigerant.

12. The method of claim 11, further comprising:
comparing the total quantity of the refrigerant contained in the cooling circuit as determined to a nominal quantity of the refrigerant for the cooling circuit; and
scheduling a maintenance operation for the air-conditioning system based on a difference between the total quantity of the refrigerant and the nominal quantity of the refrigerant.

13. The method of claim 1, wherein the total quantity of the refrigerant contained in the cooling circuit is determined without using an air temperature measurement of air external to the cooling circuit.

14. A leak detection module comprising:
a group of sensors configured to measure physical characteristics of a refrigerant contained in a cooling circuit of an air-conditioning circuit, the sensors in the group configured to measure the physical characteristics of the refrigerant in different parts of the cooling circuit corresponding to different enthalpy levels;
a voltage sensor configured to measure a power supply voltage of a compressor of the air-conditioning system; and
a controller configured to:
determine a mass flow rate of the refrigerant based in part on the power supply voltage of the compressor as measured by the voltage sensor;
determine a total quantity of the refrigerant contained in the cooling circuit based on at least: (i) the mass flow rate, (ii) data corresponding to geometric and technical parameters of different components of the air-conditioning system, (iii) a type of the refrigerant, and (iv) signals generated by the group of sensors, the signals representative of the physical characteristics of the refrigerant in the different parts of the cooling circuit.

15. The leak detection module of claim 14, wherein the group of sensors comprise at least two temperature sensors and at least two pressure sensors.

16. The leak detection module of claim 15, wherein the at least two temperature sensors and the at least two pressure sensors comprise:
a first temperature sensor disposed on the cooling circuit between an expansion valve and a condenser of the air-conditioning system, the first temperature sensor configured to measure a subcooling temperature of the refrigerant in the cooling circuit,
a second temperature sensor disposed on the cooling circuit between the compressor and an evaporator of the air-conditioning system, the second temperature sensor configured to measure a superheating temperature of the refrigerant in the cooling circuit,
a first pressure sensor disposed between the compressor and the condenser, the first pressure sensor configured to generate a signal representative of a high pressure measurement of the cooling circuit, and
a second pressure sensor disposed between the compressor and the evaporator, the second pressure sensor configured to generate a signal representative of a low pressure measurement of the cooling circuit.

17. The leak detection module of claim 16, wherein the controller is configured to determine the mass flow rate of the refrigerant based on:
(i) the power supply voltage as measured by the voltage sensor;
(ii) the subcooling temperature of the refrigerant as measured by the first temperature sensor;
(iii) the superheating temperature of the refrigerant as measured by the second temperature sensor;
(iv) the high pressure measurement of the cooling circuit;
(v) the low pressure measurement of the cooling circuit; and
(vi) thermodynamic characteristics of the compressor.

18. The lead detection module of claim 14, wherein the sensors and the controller are disposed onboard a vehicle that includes the air-conditioning system.

19. The leak detection module of claim 14, wherein the controller is configured to determine the total quantity of the refrigerant contained in the cooling circuit without using an air temperature measurement of air external to the cooling circuit.

20. The leak detection module of claim 14, wherein the controller is configured to compare the total quantity of the refrigerant contained in the cooling circuit to a nominal quantity of the refrigerant for the cooling circuit, the controller configured to schedule a maintenance operation for the air-conditioning system based on a difference between the total quantity of the refrigerant and the nominal quantity of the refrigerant.

* * * * *